US005876175A

United States Patent [19]

[11] Patent Number: 5,876,175

[45] Date of Patent: Mar. 2, 1999

Braud

[54] DEVICE FOR SECUREMENT OF A GOODS HANDLING CARRIAGE TO A TRUCK CORRESPONDING SUPPORT CHASSIS AND TRUCK

[75] Inventor: Marcel-Claude Braud, Champtoceaux, France

[73] Assignee: Manitou BF, Ancenis, France

[21] Appl. No.: 822,918

[22] Filed: Mar. 21, 1997

[30] Foreign Application Priority Data

Apr. 3, 1996 [FR] France .................................... 6 04160

[51] Int. Cl.[6] ........................................ B60P 3/06

[52] U.S. Cl. ........................................ 414/467; 414/462

[58] Field of Search .............................. 414/467, 498, 414/347, 462; 416/3, 4, 7

[56] References Cited

U.S. PATENT DOCUMENTS

| | | | |
|---|---|---|---|
| 3,528,578 | 9/1970 | Schoerberger | 414/462 |
| 3,738,481 | 6/1973 | Cwycyshyn et al. | 410/7 X |
| 3,777,921 | 12/1973 | Nelson | 414/462 |
| 3,799,379 | 3/1974 | Grether et al. | 414/467 |
| 4,061,237 | 12/1977 | Austin et al. | 414/467 |
| 4,154,348 | 5/1979 | Biaggini et al. | 410/7 X |
| 4,180,363 | 12/1979 | Steiger et al. | 414/347 |
| 4,396,341 | 8/1983 | Brouwer et al. | 414/467 |
| 4,571,139 | 2/1986 | Moseley et al. | 414/467 X |
| 4,738,581 | 4/1988 | Kuhlmar | 414/462 |
| 5,575,604 | 11/1996 | Dubosh etal. | 414/467 X |
| 5,651,658 | 7/1997 | Holmes et al. | 414/467 X |

FOREIGN PATENT DOCUMENTS

| | | | |
|---|---|---|---|
| 0 241 827 | 10/1987 | European Pat. Off. . | |
| 0 571 240 | 11/1993 | European Pat. Off. | 414/467 |
| 2 669 588 | 5/1992 | France . | |
| 2601668 | 7/1976 | Germany | 414/467 |
| 3308778 | 9/1984 | Germany | 414/498 |

*Primary Examiner*—David A. Bucci

*Attorney, Agent, or Firm*—Young & Thompson

[57] ABSTRACT

A device for securing a goods handling carriage (1) on a truck, comprises a support chassis (11) provided with first anchoring and securing structure **(14*a*, 15*a*) to secure the chassis (11) on the bed (3) of the truck, and second anchoring and securing structure (14*b*, 15*b*) to secure the chassis (11) below the truck bed (3)**.

10 Claims, 6 Drawing Sheets

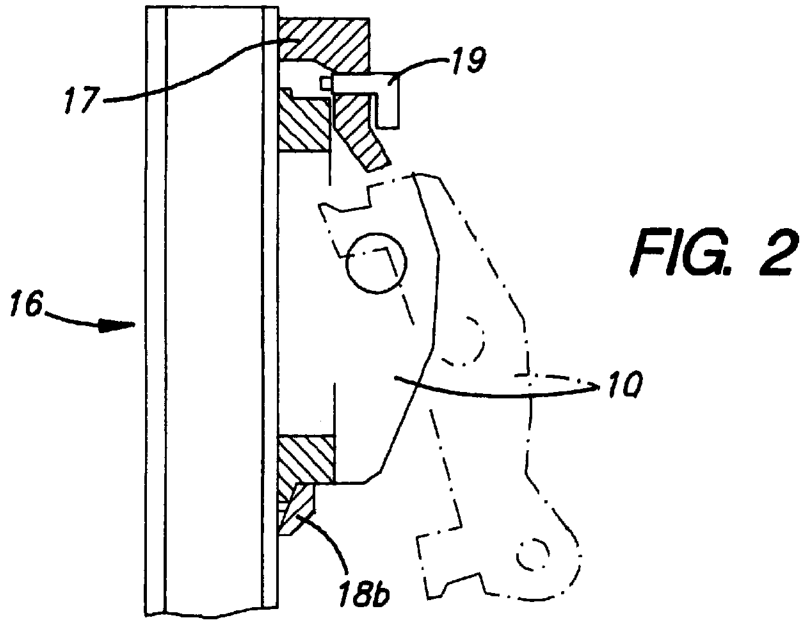
FIG. 2
FIG. 3
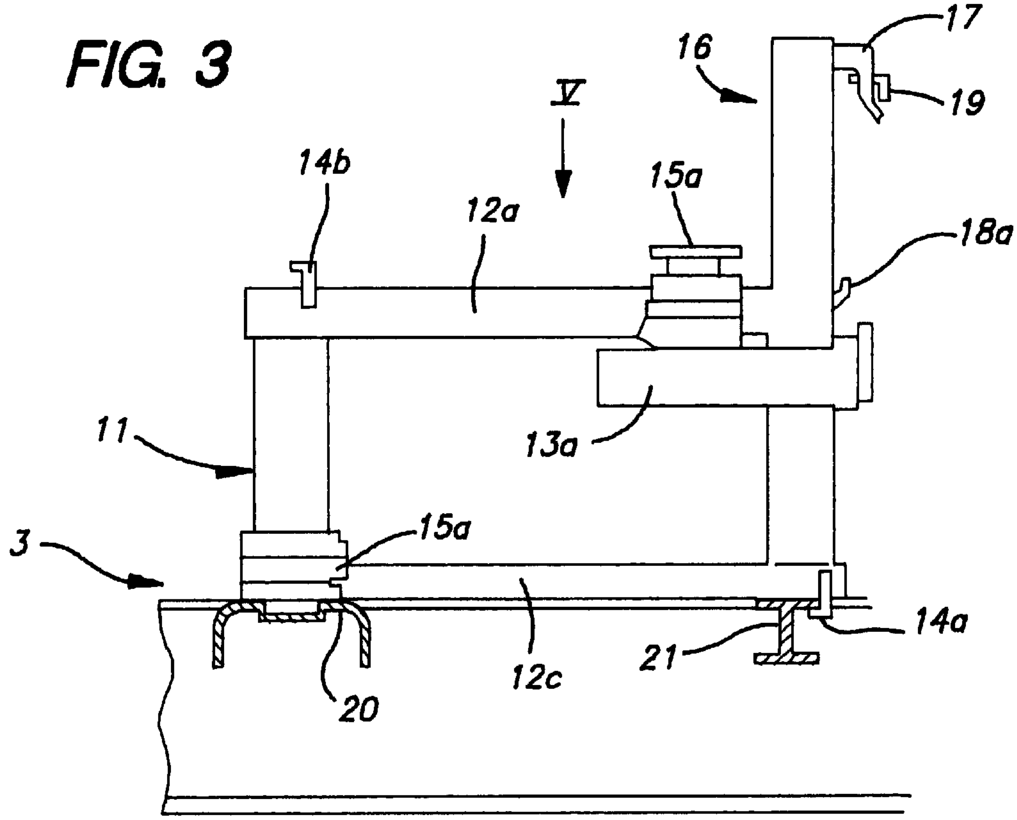

DEVICE FOR SECUREMENT OF A GOODS HANDLING CARRIAGE TO A TRUCK CORRESPONDING SUPPORT CHASSIS AND TRUCK

This application corresponds to French application 96 04160 of Apr. 3, 1996, the disclosure of which is incorporated herein by reference.

FIELD OF THE INVENTION

The invention relates to a device for securement of a goods handling carriage adapted to be carried on a truck or similar carrying vehicle, to a support chassis comprising support means for a goods handling carriage adapted to be loaded on a truck, as well as a truck adapted to transport a loaded goods handling carriage.

BACKGROUND OF THE INVENTION

French 2.298.454 discloses a truck with a carried elevating carriage. The rear of this truck is provided with joists in a casing, which are open at their rear ends and which extend in the longitudinal direction of the truck, and in which the arms of the carriage fork are received. At a certain distance below said joists in a casing, the truck is provided with two housings also extending in the longitudinal direction of the vehicle and at each of which a slidable joist is disposed. These joists can, in their extreme retracted position, be blocked and constitute a support surface for the chassis of the carriage when the latter rests on the branches of its fork in the joists in a casing. The arrangement is such that the carriage chassis is pressed downwardly against the joists by raising the arms of the fork.

This truck with its carried elevating carriage, of the prior art, has several drawbacks: first, because of the extension of the carriage rearwardly of the truck, the total rolling length of the truck is increased and the signal lights of the truck are partially masked by the carriage carried at the rear of the truck; secondly, the overhanging position of the carriage loaded on the rear of the truck modifies in an important manner the distribution of the weight on the axles of the truck and generally gives rise to overloading the rear axle and underloading the front steering axle, in particular when the truck is running empty.

OBJECT OF THE INVENTION

The invention has for its object to overcome these drawbacks, by improving the distribution of the load on the axles when the truck runs empty or partially loaded and by limiting the total volume of load of the truck bed when the truck is fully loaded.

SUMMARY OF THE INVENTION

The invention provides a device for securement of a goods handling carriage adapted to be loaded on a truck or similar carrying vehicle, of the type comprising in combination: on the one hand, means for positioning on the bed of the truck or similar vehicle, and, on the other hand, means for anchoring and securing a support chassis, said support chassis being provided with first anchoring and securement means adapted to coact with the first positioning means to secure said chassis on said truck bed as well as second anchoring and securement means adapted to coact with second positioning means to fix said chassis below said truck bed.

According to a preferred characteristic of the invention, the anchoring means of the chassis comprise at least one profile in the shape of an angle iron and securement means for the chassis comprise at least one quick securement member by a quarter turn.

The invention also provides a support chassis comprising support means for a goods handling carriage adapted to be loaded on a truck, provided with first and second anchoring and securement means, respectively on and below the bed of a truck or similar vehicle.

According to other characteristics of the invention:

- this chassis has substantially the shape of a chair whose back is adapted to be secured to the apron of a goods handling carriage adapted to be loaded on a truck.
- said securement means are rapid securement means by a quarter turn.
- the support means comprise telescopic support means, adapted to slide between a retracted position, internally of the chassis, and a support position, externally of the chassis.

The invention finally provides a truck adapted to transport a loaded goods handling carriage, of the type comprising a loading plate provided with first and second positioning means.

According to other characteristics of the invention:

- said positioning means comprise at least one traverse having an anchoring edge and at least one recess for a quick securement member of said chassis.
- the loading plate of the truck comprises at least one retractable portion for the passage of at least one carriage wheel to be loaded.
- each retractable part can be swung down about an articulation hinge and adapted to be supported by a retractable support.

BRIEF DESCRIPTION OF THE INVENTION

The invention will be better understood from the description which follows, given by way of non-limiting example with reference to the accompanying drawings, in which:

FIG. 2 is an enlarged fragmentary view, partially in cross section, on the line II of FIG. 1.

FIG. 3 shows schematically a side elevational and partial cross-sectional view of a support chassis according to the invention fixed on the bed of a truck according to the invention.

FIGS. 6 through 11 disclose the successive steps of mounting and positioning on the bed of a truck according to the invention, a goods handling carriage loaded on the bed of a truck according to the invention.

Figure 1:
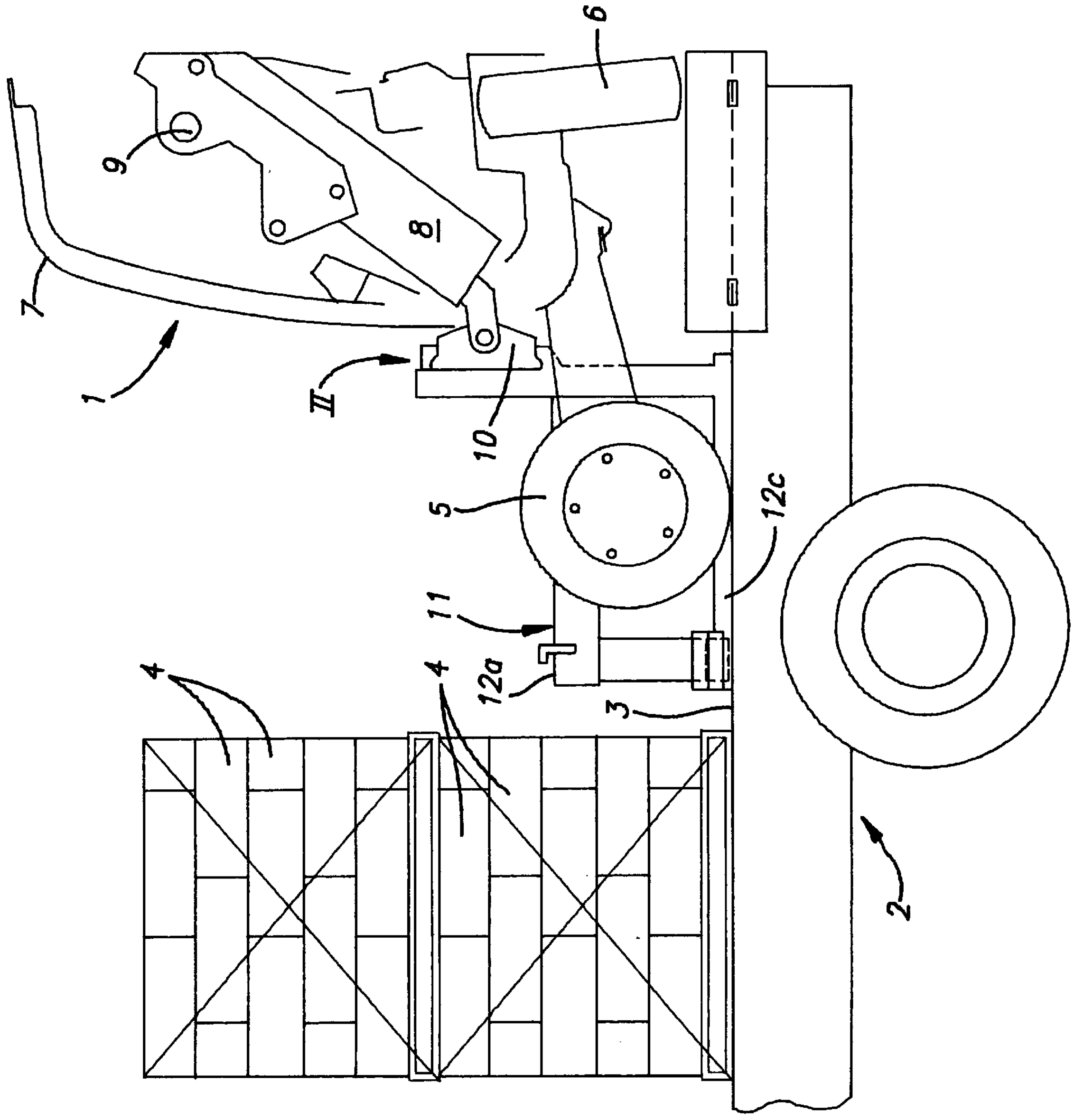
FIG. 1 shows schematically a side and rear elevational view of the loading platform of a truck on which a goods handling carriage is secured according to the invention.

With reference to FIGS. 1 to 3, identical reference numerals describe identical or functional equivalent elements.

In FIG. 1, a motorized goods handling carriage 1 is secured to a truck 2 whose bed 3 is partially loaded with palletized loads 4.

DETAILED DESCRIPTION OF THE INVENTION

The carriage 1 is preferably a carriage of the type comprising a chassis having a U-shaped configuration that is forwardly opening, provided with two front wheels and a steering rear wheel. A carriage of this type is disclosed in French 2 724 374, in the name of the present applicant: it is a motorized goods handling carriage, adapted to be loaded on the rear of a carrying vehicle of the type comprising a chassis having a U shape provided with front wheels 5 and a steering rear wheel 6, a driver's station 7 forming a protective cabin, and lifting means comprising a telescopic arm 8 mounted pivotally under the action of a raising jack about a substantially horizontal axis 9 located to the rear of the carriage substantially above the rear drive wheel 6.

The front end of the telescopic arm 8 carries a forked apron 10 inclinable under the action of an accumulator jack and the apron 10 can or not carry its two forks, when the support chassis 11 corresponding to the securement on the bed 3 of the truck 2 is secured to the apron 10 forming a coupling head.

The support chassis 11 according to the invention comprises two upper beams 12*a* and 12*b* and two lower beams 12*c* and 12*d* connected by suitable uprights and cross members, as well as means 13*a*, 13*b* for retractably supporting the goods handling carriage. The support chassis 11 is provided with first anchoring means 14*a* and first securement means 15*a*, as well as second anchoring means 14*b* and second securement means 15*b*. The first anchoring means and securement means 14*a*, 15*a* are adapted to coact with positioning means for the bed to secure the chassis 11 on the bed 3. The chassis 11 has substantially the shape of a chair whose back 16 is adapted to be secured to the apron 10 supporting the forks of the goods handling carriage 1. To this end, the back 16 comprises a first configuration 17 for engagement of the apron 10 of the fork and second configurations 18*a*, 18*b* forming retaining hooks for the apron 10 of the fork. After having engaged the forked apron 10 from the position shown in broken lines in FIG. 2 to the position, the apron 10 is locked against the back 16 by means of a bolt 19 which thus ensures rigid securement of the forked apron 10 and the back 16. Thanks to the rigid securement, the goods handling carriage 1 can be used for emplacement of the chassis 11 on the truck bed, as shown in FIG. 3, or below the bed, as shown in FIG. 4.

Preferably, the securement means 15*a* and 15*b* are quick quarter turn securement means. Such quick quarter turn securement means are preferably constituted by retractable bolts, of the container bolt type.

Figure 4:
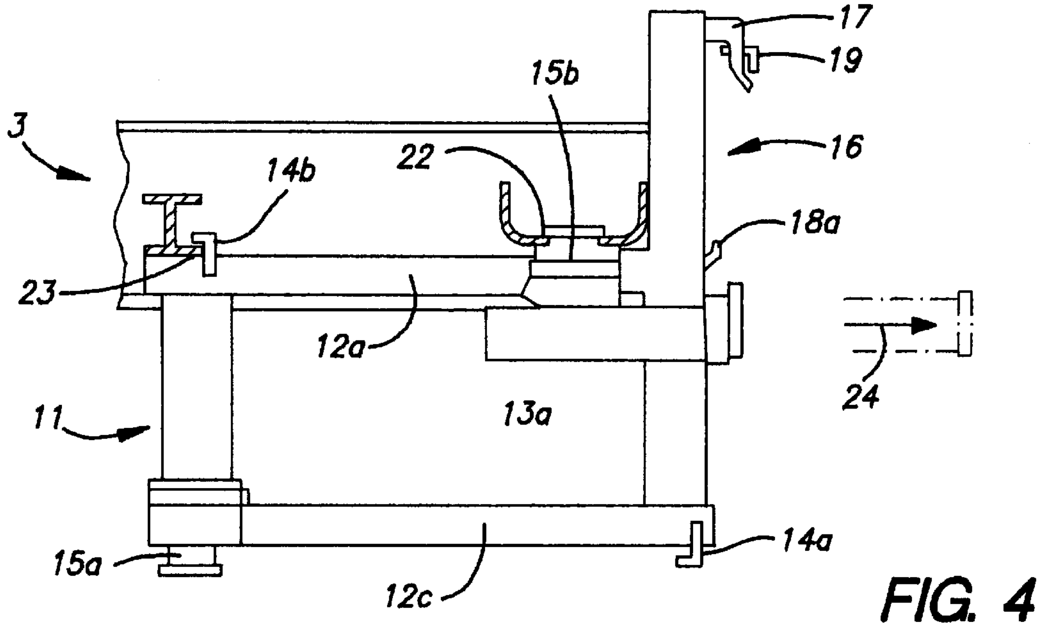
FIG. 4 shows schematically a side elevational and partial cross-sectional view of a support chassis according to the invention fixed to the rear end and below the bed of a truck according to the invention.
Figure 5:
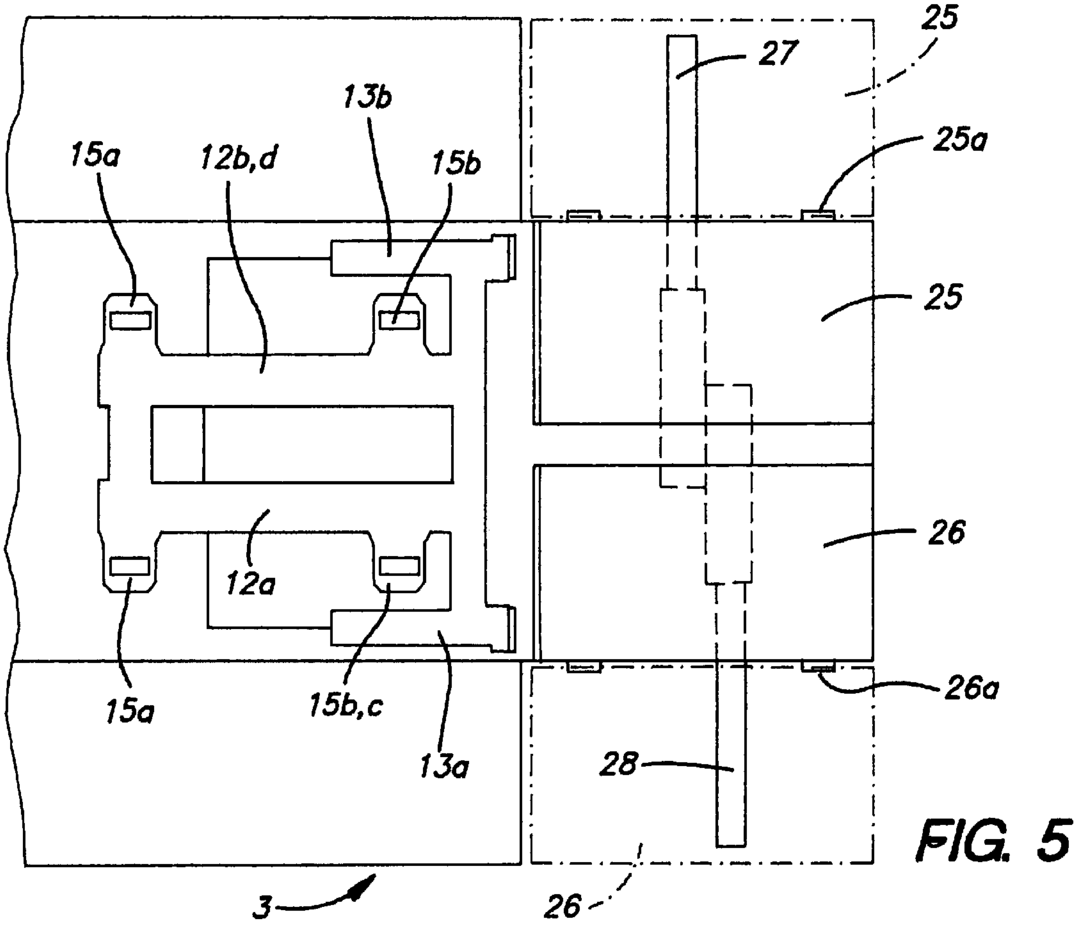
FIG. 5 shows schematically a plan view according to arrow V of FIG. 3, of a support chassis according to the invention fixed on the bed of a truck according to the invention.

With reference to FIGS. 3 to 5, identical reference numerals designate identical or functional equivalent elements.

The truck bed 3 is provided with first positioning means constituted by two rectangular openings 20 provided in a chassis cross member of the bed, of U shape, and by the securement edge 21 of a cross member in the form of an H. These first positioning means coact with anchoring means 14*a* and securement means 15*a* to fix the chassis 11 on the bed 3. The truck also comprises a lower cross member of U shape in which are provided two rectangular openings 22 analogous to the openings 20 above, and a cross member of H shape having an anchoring edge 23. The rectangular openings 22 and the edge 23 constitute second positioning means adapted to coact with the second anchoring means 14*b* and securement means 15*b* to secure the chassis 11 below the bed in a position permitting loading of the goods handling carriage 1 at the rear of the truck. In this position, the carriage is raised by its lifting means to permit the support means 13*a*, 13*b* to leave in the direction of the arrow 24 of FIG. 4 to a position shown in broken lines permitting supporting the chassis of the carriage 1.

In FIG. 5, the truck according to the invention preferably comprises a retractable portion for the passage of at least one wheel of the carriage to be loaded. The bed 3 preferably comprises two flaps 25, 26 swingable downward about articulation hinges 25*a*, 26*a* and adapted to be supported in the position shown in broken lines by telescopic supports 27, 28 retractable between a supporting position of the flaps 25, 26 shown in full lines and a retracted position toward the middle of the bed shown in broken lines.

With reference to FIGS. 6 to 11, the loading of a goods handling carriage 1 on the bed 3 of a truck takes place in the manner described hereafter.

Figure 6:
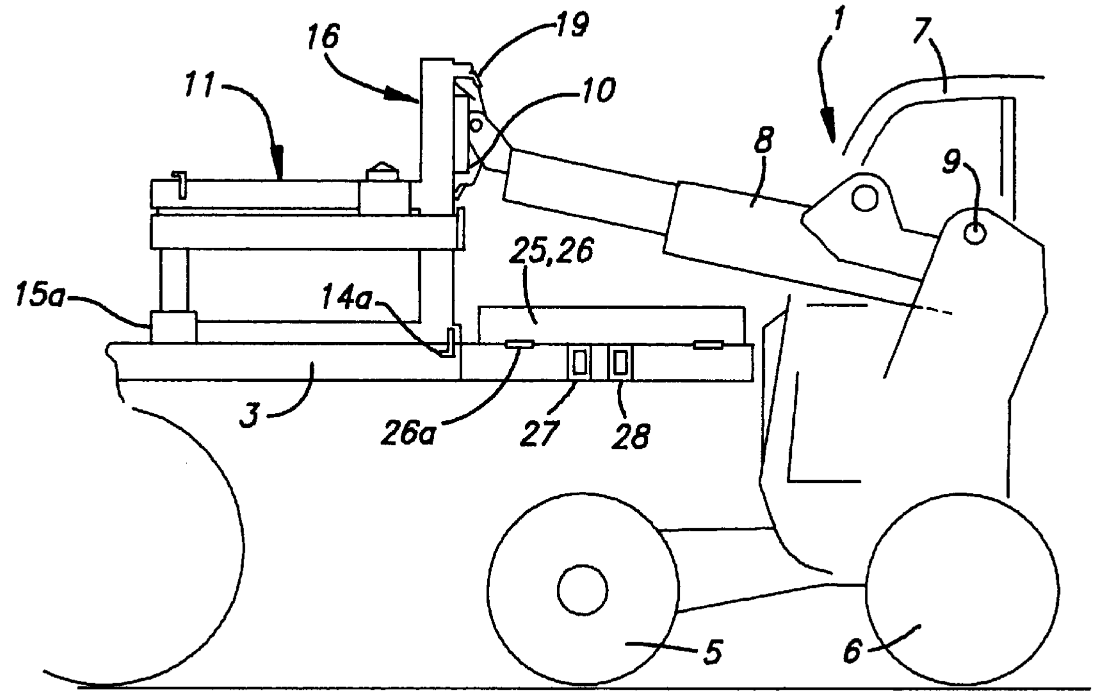

In FIG. 6, after having secured the coupling head to the fork support apron 10 in the manner described in FIG. 2, to the back 16 of the chassis 11 according to the invention, there is swung down if necessary the pivoting flaps 25, 26 about their hinges 25*a*, 26*a* and the sliding supports 27, 28 are returned to their farthest retracted position within the interior of bed 3. This swinging down is necessary only in the case in which the track, which is to say the spacing between the front wheels 5 of the goods handling carriage 1, is less than the width of the bed 3. The invention also covers all modifications in which the truck has no bed with retractable flaps and in which the spacing of the wheels 5 of the carriage does not constitute an obstacle to the loading of the carriage on the bed 3: in particular, the invention covers the modification in which the telescopic arm 8 of the carriage has a sufficient length to pass about the rear of the bed 3 in the course of loading.

Figure 7:
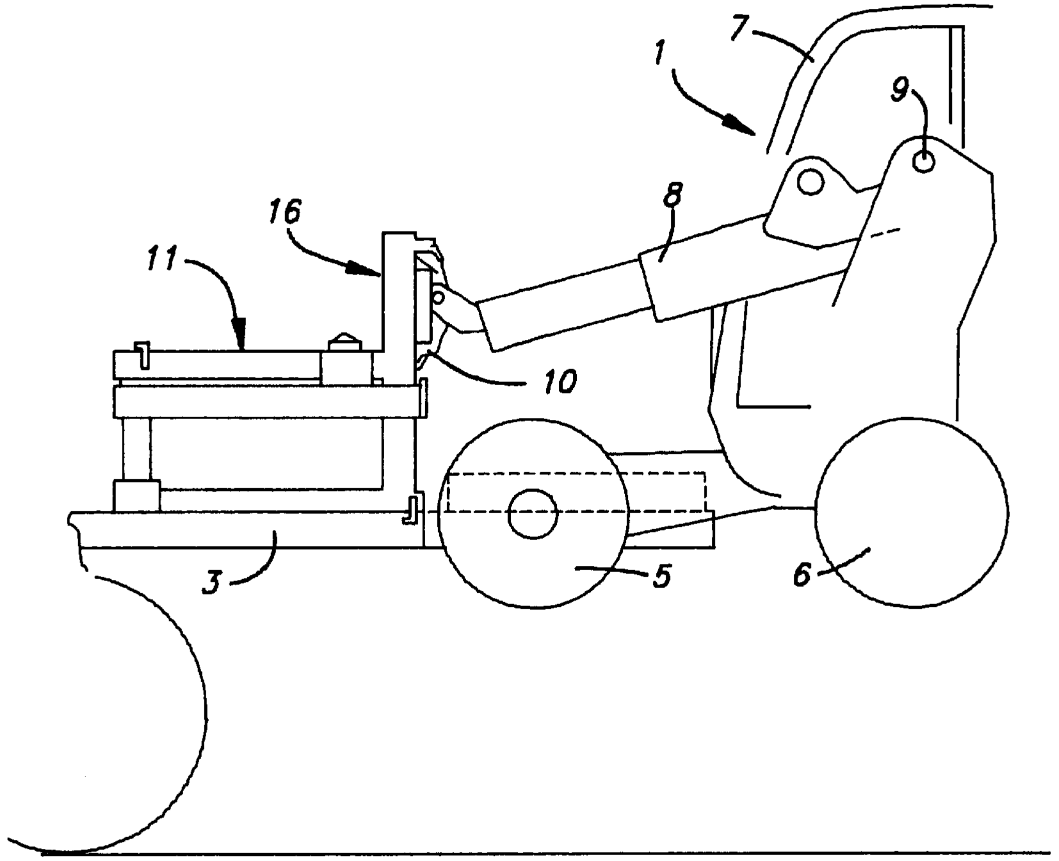

In FIG. 7, upon actuating the raising jack of the carriage 1 in the direction corresponding normally to lowering of a load, the carriage 1 is raised because of the fact that the coupling head or apron 10 is secured to the support chassis 11 fixed on the bed 3. Because of the retraction of the flaps 25, 26 and of the sliding supports 27, 28, the wheels 5 pass within the interval freed by retraction of the members 25 to 28 and the chassis of carriage 1 encloses the rear of the bed 3 during raising of the carriage 1.

Figure 8:
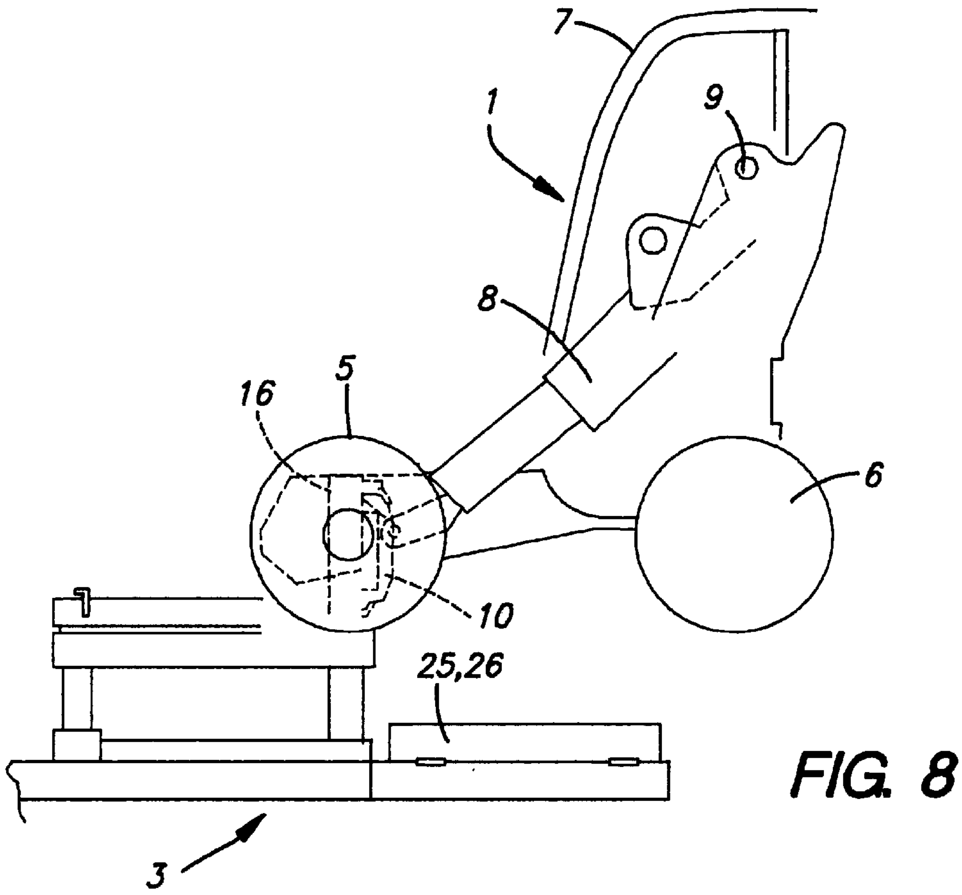

In FIG. 8, pursuing the raising by actuation of the raising jack of the telescopic arm, the carriage 1 remains substantially horizontal and reaches a highest vertically raised position. In this highest position, the carriage 1 does not extend beyond the permitted loading height, which permits loading of the carriage 1 on the bed 3 within industrial buildings.

Figure 9:
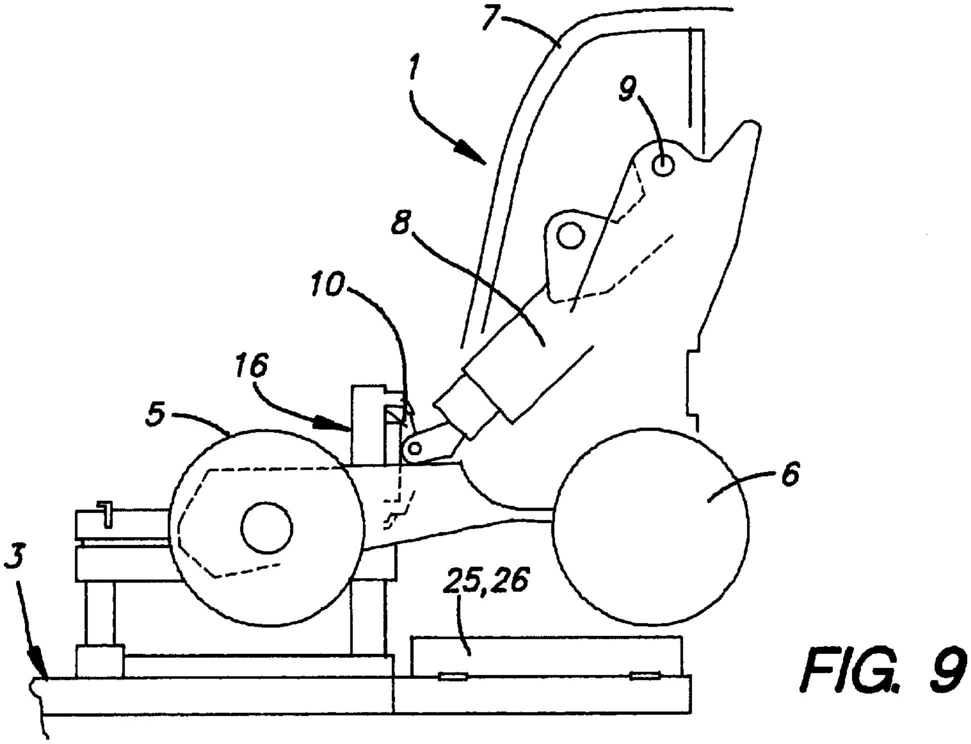

In FIG. 9, the retraction of the telescopic arm 8 is effected by the help of a telescopic jack, which gives rise to a descent of the carriage 1 onto the bed. In particular, the front wheels 5 are located above the platform of the bed 3, on opposite sides of the sliding supports 13*a*, 13*b*.

Figure 10:
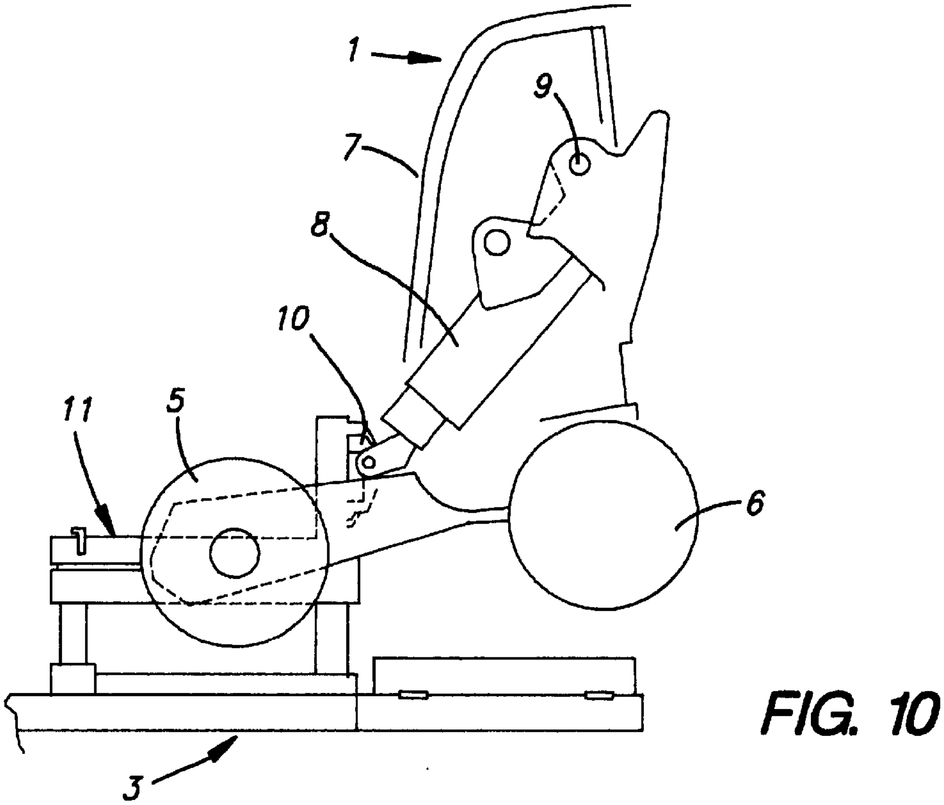

In FIG. 10, there is carried out the lowering which is effected by pivoting downwardly of the front wheels 5 by use of the accumulator jack disposed on the coupling head of the apron 10. This pivoting gives rise to descent of the wheels 5 so that they rest on the bed 3.

Figure 11:
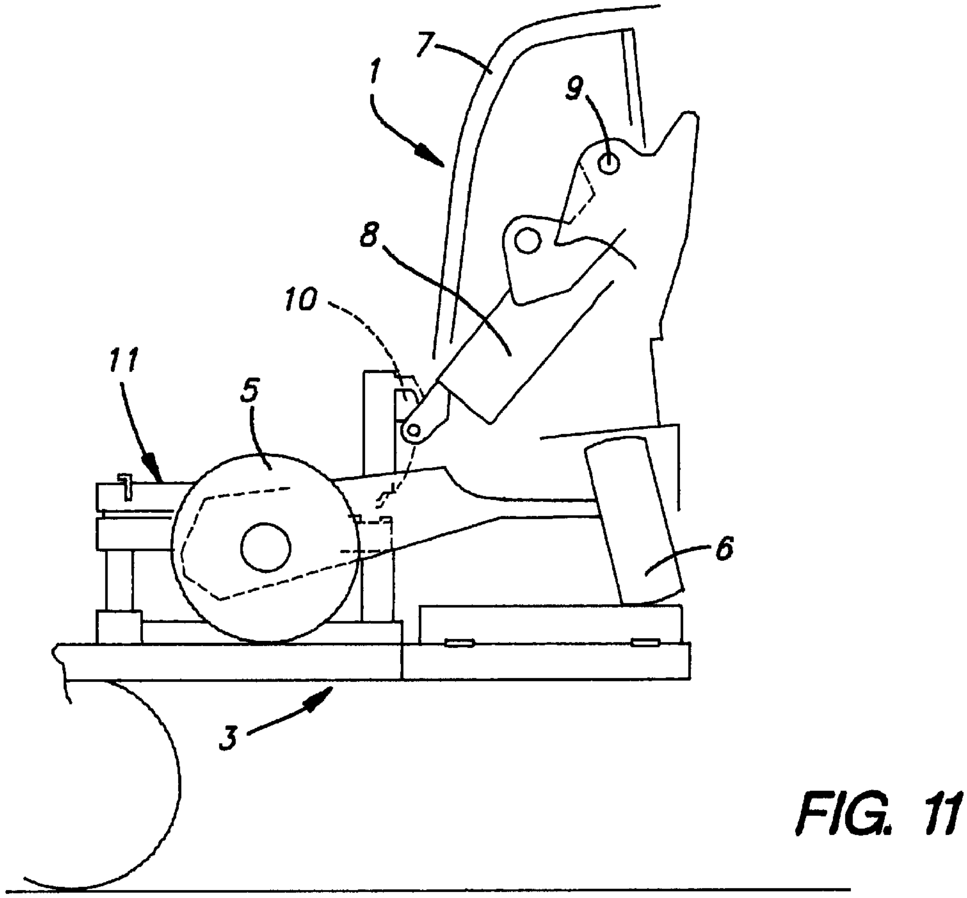

In FIG. 11, the rear steering wheel 6 is turned by 90° relative to the front wheels 5, so as to rest on the bent flaps 25 and 26, to maintain these two flaps in position and not to have any member extending beyond the rear of the bed 3.

There is thus obtained the transport position shown in FIG. 1, in which position the goods handling carriage 1 rests entirely on the bed 3 by its three wheels and remains fixed by its coupling head 10 or support chassis 11, even in the case of loss of hydraulic power, because of the stable mechanical equilibrium thus effected.

The invention described with reference to the particular embodiments is in no way limited, but covers on the contrary all modification of shape and any change in embodiment within the scope and spirit of the invention defined by the accompanying claims.

What is claimed is:

1. Support chassis comprising means (13*a*, 13*b*) for supporting a goods handling carriage (1) on a truck, said support chassis having a first lower surface and a second upper surface, and further comprising:

first anchoring means (14*a*) and first securement means (15*a*) disposed on said first lower surface for mounting the support chassis on and above a bed of said truck;

second anchoring means (14*b*) and second securement means (15*b*) disposed on said second upper surface for mounting the support chassis under a bed of said truck.

2. Support chassis according to claim 1, which has the shape of a chair having a back (16) adapted to be secured to an apron (10) supporting forks of a goods handling carriage (1) adapted to be loaded onto the truck.

3. Support chassis according to claim 1, wherein said first and second securement means (15*a*, 15*b*) are quarter turn quick securement means.

4. Support chassis according to claim 1, wherein said means for supporting a goods handling carriage on a truck comprise telescopic support means adapted to slide between a retracted position within the chassis and a support position outside the chassis.

5. A truck adapted to transport a goods handling carriage (1) loaded thereon, comprising a load carrying bed with an upper side and a lower side, and further comprising:

first positioning means (20, 21) disposed on said upper side for anchoring and securing a support chassis (11) for a said carriage on and above said bed;

second positioning means (22, 23) disposed on said lower side for anchoring and securing a support chassis (11) for a said carriage under said bed.

6. A truck according to claim 5, wherein said first and second positioning means (20–23) comprise at least one cross member having an anchoring edge (21, 23) and at least one recess (20, 22) for receiving a quick securement member (15*a*, 15*b*) of said support chassis (11).

7. A truck according to claim 5, wherein the bed (3) of the truck comprises at least one retractable portion (25, 26) to permit the passage of at least one wheel (5) of the carriage (1) to be loaded.

8. A truck according to claim 7, wherein each retractable portion (25, 26) is swingable downward about a hinge (25*a*, 26*a*) and adapted to be supported by a retractable support (27, 28).

9. The combination of a truck having a bed and of a support chassis for a goods handling carriage, comprising in combination first and second positioning means on said truck bed, anchoring and securement means on said support chassis, said support chassis having first anchoring and securement means (14*a*, 15*a*) adapted to coact with said first positioning means (20, 21) to secure said chassis (11) on and above said bed (3), and said anchoring and securement means (14*b*, 15*b*) adapted to coact with said second positioning means (20, 21) to secure said chassis (11) under said bed (3).

10. The combination of claim 9, wherein said anchoring means of the chassis (11) comprise profiled means (14*a*, 14*b*) comprising an angle iron and said means for securing said chassis comprise at least one quarter turn rapid securement member (15*a*, 15*b*).

* * * * *